Feb. 1, 1949.　　　　D. S. ASHLEY ET AL　　　　2,460,270
VALVE
Filed April 9, 1946
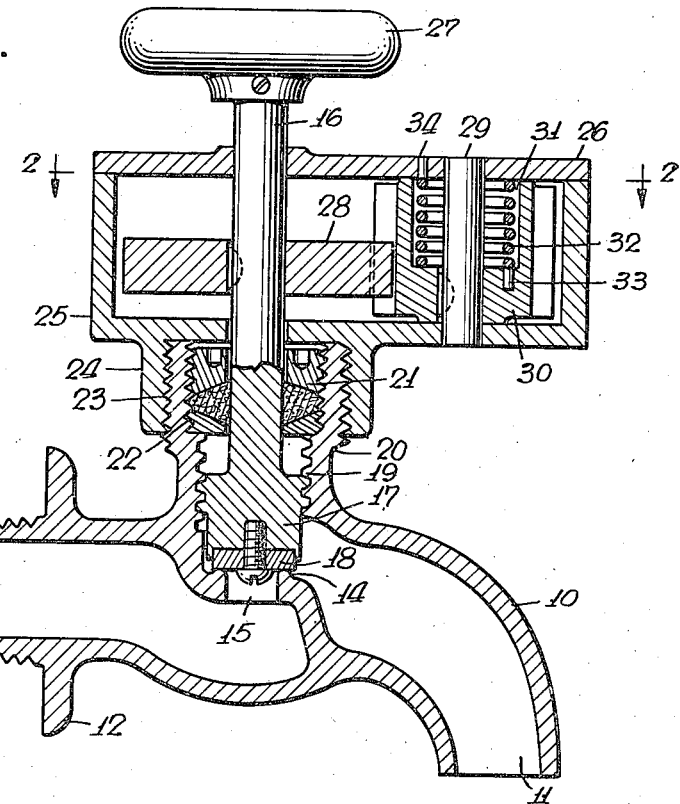
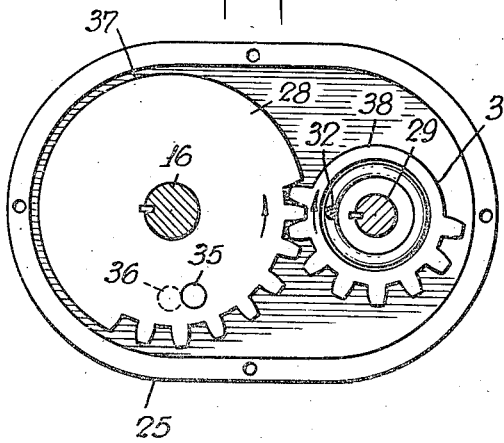
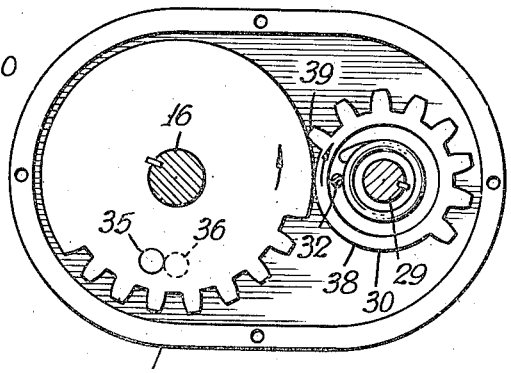
INVENTORS
Donald S. Ashley
William H. Weaver
BY
Benjamin Swedler
ATTORNEY Patented Feb. 1, 1949

2,460,270

UNITED STATES PATENT OFFICE 2,460,270

VALVE

Donald S. Ashley, Cleverdale, and William H. Weaver, Glen Falls, N. Y.; said Weaver assignor to said Ashley Application April 9, 1946, Serial No. 660,690

9 Claims. (Cl. 251—141)

This invention relates to valves or faucets. More particularly it relates to a valve or faucet provided with positive closing mechanism for closing the valve, when the actuating force which moves the valve to open position is released before the valve is opened to a predetermined position. The positive closing mechanism is not operative to close the valve upon movement thereof to a point beyond the predetermined position, the valve remaining in any open position to which it may be moved beyond the predetermined position to give a desired constant flow rate. Upon closing movement of the valve, when it reaches the aforesaid predetermined position, the positive closing mechanism again becomes operative to effect positive closing of the valve.

Among the objects of this invention is to provide a valve or faucet which combines the advantages of a positive closing mechanism to effect closing of the valve or faucet, upon release of the actuating force which tends to open the valve, with the advantages of a constant flow valve or faucet, which constant flow valve or faucet can be set to give a desired flow rate exceeding a predetermined rate of flow. Another object is to provide such valve which will remain in the set position, the valve or faucet being positively closed when the actuating force moving it from closed position to the aforesaid predetermined position is released, or when the valve is being closed, and for this purpose is moved from a position at which a constant flow takes place, to the predetermined position. Other objects and advantages of this invention will be apparent from the following detailed description thereof.

In the preferred embodiment illustrated on the drawing, the invention is shown incorporated in a faucet, and the present description will be confined to the present illustrated embodiment of the invention. It will be understood, however, that the novel features and improvements are susceptible to other applications such, for example, as valves generally and other equipment in which it may be desired to effect actuation of a moving member so that when this member is actuated to move it through a predetermined path of movement and the actuating force is released, the member is positively returned to its original position, and once moved beyond a predetermined point, further movement thereof by the actuating means can take place without the member being returned to its original position; upon movement of the member in a reverse direction, once the predetermined point is reached, the member is again positively moved to its original position. Hence the scope of this invention is not confined to the embodiment herein described.

In the accompanying drawing,

Fig. 1 is a vertical section partly in elevation through a faucet embodying this invention;

Fig. 2 is a plan view taken in the plane indicated by line 2—2, Fig. 1, in the direction indicated by the arrows and shows the mutilated gears in their initial position of operation, i. e. the position the gears occupy when the valve is closed; and Fig. 3 is a plan view similar to Fig. 2 except that it shows the relative position of the mutilated gears when the valve stem has been moved to completely open the valve.

Referring to the drawing, 10 indicates a faucet having a conventional spout 11, flange 12 and threaded end portion 13 arranged to be placed in threaded engagement with a main to which the faucet may be connected. A valve seat 14 is formed on the upper portion of the walls defining the valve opening 15. Flow through this opening 15 is controlled by a valve stem 16 having a threaded lower cylindrical portion 17 provided with a washer 18 adapted to seat on the valve seat 14 and interrupt flow through the valve opening 15. The lower cylindrical portion 17 of the valve stem is in threaded engagement with the threads 19 on the interior of the housing 20 integral with the faucet 10. A suitable packing gland 21 is provided at the top of this housing 20 through which the valve stem 16 extends. This packing gland 21 may be of any conventional construction and provides a liquid tight seal between the valve stem 16 and the valve housing 20. The valve of faucet thus far described represents but one conventional type of faucet and it is, therefore, believed that further description thereof is unnecessary. It will be understood this invention can be employed with other types of valves and faucets.

The exterior of housing 20 is provided with a threaded portion 22 which is in threaded engagement with the threads 23 on the interior of the annular flange 24, depending from a cylindrical casing 25. This casing may be provided with a wall or cover 26, removable if desired, through which the valve stem 16 extends as clearly appears from Fig. 1, a handle 27 being secured to the end of stem 16 for the purpose of effecting its operation.

Keyed to stem 16 is a mutilated gear 28. An idler shaft 29 is mounted for rotation in the casing 25, the ends of this shaft being suitably journalled in the base of casing 25 and the wall 28. Keyed to this idler shaft is a second mutilated gear 30 of smaller diameter than gear 28 and having gear teeth thereon arranged to mesh with the gear teeth on the mutilated gear 28 as shown in Fig. 2. Desirably, gear 30 is provided with a hollow portion 31 providing a housing for a coil spring 32, one end 33 of which is fastened to the gear 30 and the other end 34 of which is secured to the wall 26 of this casing. Thus when gear 28 is actuated by handle 27, rotating stem 16 to open the valve, through the meshing teeth on gear 30, the latter gear is rotated to tension the spring 32 as will be hereinafter more fully explained.

Gear 28 has fastened to or integral therewith a stop member 35 extending from the face thereof and arranged to engage a cooperating stop 36 disposed on the wall 26 of casing 25 and extending downwardly from this wall toward but short of the face of gear 28. These stops do not appear in Fig. 1 because this view is taken in a vertical plane in which the stops do not appear. Stop 36, as is evident from Fig. 3, is positioned so that it is engaged by the stop 35 on gear 28, when the gear is moved so that it makes approximately one complete revolution at which point the valve stem is positioned relative to valve opening 15, so that maximum flow therethrough takes place.

Gears 28 and 30, it will be noted, have meshing teeth extending about a portion only of the periphery, namely, approximately one-fourth of the periphery in the case of mutilated gear 28, and one-half of the periphery in the case of the gear 30. The remaining portion 37 of the periphery of gear 28 is of substantially the same diameter as the diameter of the toothed portion of the gear at the point of maximum diameter, i. e. projecting ends of the gear teeth and the periphery of portion 37 are defined by one and the same circle. In the case of the mutilated gear 30, on the other hand, portion 38, free of teeth, is of a reduced diameter, as compared with the toothed portion of this gear, i. e the gear is constituted of a cylindrical body portion, from the periphery of a portion of which the teeth project. Thus, when the mutilated gear 28 is moved to a point such that the teeth are no longer in mesh, toothless portion 37 of gear 28 moves past toothless portion 38 of gear 30 without effecting movement of gear 30. If desired, the diameters of the toothless portions of gears 28 and 30 may be such that a small clearance is provided therebetween to permit movement of one gear relative to the other without effecting movement of the other; the toothed portions of the mutilated gears, however, should be so constructed and designed that they mesh, and when one gear is moved relative to the other with the teeth in mesh, it effects actuation of the other.

In operation, with the parts in the position shown in Figs. 1 and 2 in which position the valve is closed, upon actuation of the handle 27 to rotate the stem 16, the valve stem is removed from the seat 14 opening the valve partially. As the stem 16 is rotated, mutilated gear 28 keyed thereon is also rotated in the direction shown by the full line arrows, effecting rotation of gear 30 in the direction indicated by the full line arrows to tension spring 32, this gear 30 being rotated until the last tooth on gear 28 engages and moves past tooth 39 (Fig. 3) on gear 30. The gears, valve seat and valve stem are so proportioned and designed that when this point is reached, the valve is opened to a desired predetermined extent or position. Further movement of valve stem 16 effects further rotation of gear 28, the smooth or toothless portion 37 thereof sliding past the portion 38 on mutilated gear 30 with the tooth 39 of this gear engaging the smooth portion 37 of gear 28, thereby preventing gear 30 from rotating under the influence of the tension imparted to spring 32. In other words, the spring 32 is maintained under the tension imparted thereto by the initial movement of gear 28 while meshing with gear 30 as long as tooth 39 is in engagement with any portion of the toothless area 37 of gear 28. Hence the valve stem may be moved to any desired position beyond the aforesaid predetermined position, to effect any desired increased rate of flow without effecting the tension imparted to spring 32. When the valve stem has been moved to its maximum position, stop 35 on gear 28 engages stop 36, as shown in Fig. 3, preventing further movement of valve stem 16 in the direction indicated by the full line arrows in Fig. 3 and preventing the teeth on gear 28 from meshing with those on gear 30 which would take place if rotation of gear 28 were continued in the full line arrow direction.

Upon movement of valve stem 16 in the opposite direction to effect closing of the valve, as long as the stem is not moved to a point such that the gear teeth on gear 28 engage and mesh with the teeth on gear 30, the positive closing mechanism, i. e. the spring tensioned multilated gear 30 and associated gear 28 keyed to stem 16, remains ineffective, and the valve stem may be set to give any desired flow rate. Once the valve stem is moved to a position such that meshing of the teeth on the mutilated gears 28, 30 takes place, spring 32 immediately becomes effective to cause, through gear 30 and gear 28, closing movement of valve 16 to effect tight closing of the valve.

When the valve is being opened, if it is not opened fully to a point beyond the aforesaid predetermined position, the positive closing mechanism, upon release of the force actuating the valve stem, immediately becomes effective to close the valve.

It will be noted from the above description that this invention provides a valve or faucet which embraces the advantages of a positive closing mechanism for the valve with the advantages of a constant flow valve. Thus the valve or faucet is particularly applicable to hotels, institutions, homes, etc., resulting in a substantial saving in fluid, flow of which is controlled by the valve or faucet. With this valve or faucet, if a person desires a slight flow and opens the valve partially for this purpose, the valve closes automatically, so that no wastage of fluid takes place. On the other hand, when a substantial constant flow is desired, the valve is moved past the aforesaid predetermined position and such flow obtained. With the large flow obtained with the valve opened to a point past the predetermined position, there is little danger that the valve would be left in this position unless continued flow is desired. Once the operator starts to close the valve to reduce the flow and reaches the predetermined position, the positive closing mechanism automatically becomes operative to effect closing of the valve with consequent elimination of fluid wastage.

Since certain changes may be made in the above construction and different embodiments of the invention could be made without departing from the scope thereof, it is intended that all matter contained in the above description or shown in the accompanying drawing shall be interpreted as illustrative and not in a limiting sense.

What is claimed is:

1. Operating mechanism comprising, in combination, a moving member, a mutilated gear on said moving member and adapted to be moved in one direction on actuation of said moving member, said mutilated gear being movable through a path including a predetermined point, a second mutilated gear arranged to mesh with said first-mentioned mutilated gear, spring means associated with said second mutilated gear adapted to be placed under tension on actuation of said second mutilated gear, said mutilated gears and spring means being constructed and arranged so that unless said first-mentioned mutilated gear is moved beyond said predetermined point by said moving member, upon interruption of the actuation of said moving member the spring means causes the second mutilated gear to actuate the first-mentioned mutilated gear to restore the moving member to its original position, and upon movement of said first-mentioned mutilated gear beyond said predetermined point, the spring means becomes ineffective to cause the second mutilated gear to effect actuation of the first-mentioned mutilated gear.

2. In a valve, in combination, a valve seat, a valve stem having a portion cooperating with said seat arranged to control flow therethrough, said valve stem being arranged to be moved through a path including a predetermined point, a mutilated gear on said valve stem, a second mutilated gear having its teeth arranged to mesh with the teeth on the first-mentioned mutilated gear, and tension means for placing said second mutilated gear under tension, said mutilated gears and means being constructed and arranged so that when said valve stem is moved the tension means and said second mutilated gear are placed under tension until the stem is moved beyond said predetermined point, upon interruption of movement of the valve stem during the initial portion of movement thereof, and before said valve stem is moved beyond said predetermined point, said tension means is effective to close said valve and, upon movement of said valve stem beyond said predetermined point, said tension means become ineffective to effect actuation of said valve.

3. A valve comprising, in combination, a valve stem, a mutilated gear having a smooth portion on said stem, a second mutilated gear the teeth of which mesh with the teeth of the first-mentioned mutilated gear, a spring associated with said second-mentioned mutilated gear to place said gear under tension, said mutilated gears being constructed and arranged so that they mesh during initial portion of movement of the gears effecting tensioning of said spring and upon continued movement the smooth portion of the first-mentioned mutilated gear rides past a tooth on the second mutilated gear, and no movement of the second gear by the first-mentioned gear is effected in the continued movement of the first gear.

4. A valve comprising, in combination, a valve stem arranged to be moved through a path including a predetermined point, means for moving the valve stem to effect opening and closing movement of the valve, positive closing mechanism for the valve, said mechanism comprising a pair of meshing mutilated gears, one of which is mounted on the valve stem and tension means for the other of said gears placed under tension upon movement of the valve stem to effect opening of said valve, said positive closing mechanism being constructed and arranged so that said tension means upon opening of said valve is placed under tension and effects positive closing of said valve during its initial movement unless moved beyond said predetermined point, and also effects positive closing of said valve when moved to closing position beyond said predetermined point.

5. A valve comprising, in combination, a valve stem, a casing through which said stem extends, a mutilated gear on said stem, said gear being disposed in said casing, an idler shaft mounted for rotation in said casing, a second mutilated gear on said idler shaft and meshing with the first-mentioned gear, and a spring having one end fastened to the second gear and the other end to the casing and arranged to be placed under tension upon rotation of said second gear by the first-mentioned gear.

6. A valve comprising, in combination, a valve stem, a casing through which said stem extends, a mutilated gear on said stem, said gear being disposed in said casing, an idler shaft mounted for rotation in said casing, a second mutilated gear on said idler shaft and meshing with the first-mentioned gear, a spring having one end fastened to the second gear and the other end to the casing, said mutilated gears and spring being constructed and arranged so that the gears mesh during initial portion of movement of the gears and effect tensioning of the spring, and upon continued movement the smooth portion of the first-mentioned mutilated gear rides past a tooth on the second mutilated gear with no movement of the second gear being effected by the first mentioned gear in the continued movement thereof, whereby, while the toothed portions of the mutilated gears are in mesh, closing of the valve is automatically effected by the spring tensional second gear upon release of the actuating force to open the valve, and the spring tensioned second mutilated gear is ineffective to effect closing of the valve when the toothed portions of the mutilated gears are not in mesh.

7. Operating mechanism comprising, in combination, a moving member, a tooth member movable with said moving member in one direction on actuation of said moving member, said tooth member being movable through a path including a predetermined point, means arranged to be moved by said tooth member, and tension means for placing said first-mentioned means under tension, said moving member, tooth member, first-mentioned means and tension means being constructed and arranged so that upon actuation of said tooth member said tension means is placed under tension, and upon interruption of the actuation of said tooth member said tension means effects actuation of said first-mentioned means to move said tooth member in a reverse direction unless the said tooth member is moved beyond said predetermined point.

8. Operating mechanism comprising, in combination, moving means, a member on said moving means, said member having a recess and being adapted to be moved in one direction on actuation of said moving means through a path including a predetermined point, a second member having a raised portion arranged to enter said recess in said first-mentioned member, tension means, movement of said second member placing said tension means under tension, said members and tension means being constructed and arranged so that unless said first-mentioned member is moved beyond said predetermined point by said moving means, upon interruption of the actuation of said moving means said tension means through the said second member actuates the first-mentioned member to restore the latter to its original position, and upon movement of said first-mentioned member beyond said predetermined point the said tension means becomes ineffective to effect actuation of the first-mentioned member.

9. In a valve, in combination, a valve seat, a valve stem having a portion cooperating with said seat arranged to control flow therethrough, said valve stem being movable through a path including a predetermined point, a member having a recess, said member being mounted on said valve stem, a second member having a projection for entering said recess, and tension means for placing said second member under tension, said members and tension means being constructed and arranged so that when said valve stem is moved to open the valve the tension means is placed under tension, upon interruption of movement of the valve stem during the initial portion of movement thereof and before said valve stem is moved beyond said predetermined point, said tension means effects actuation of said second member to close said valve and upon movement of said valve stem beyond said predetermined point said tension means becomes ineffective to effect closing of said valve.

DONALD S. ASHLEY.
WILLIAM H. WEAVER.

REFERENCES CITED

The following references are of record in the file of this patent:

UNITED STATES PATENTS

| Number | Name | Date |
|---|---|---|
| 536,119 | Amsbary | Mar. 19, 1895 |
| 1,042,528 | Brown | Oct. 29, 1912 |
| 1,846,785 | Brietling | Feb. 23, 1932 |